United States Patent [19]

Malikowski et al.

[11] Patent Number: 4,749,594

[45] Date of Patent: Jun. 7, 1988

[54] METHOD FOR COATING SURFACES WITH HARD SUBSTANCES

[75] Inventors: Willi Malikowski, Aschaffenburg; Andreas Szulczyk, Linsengericht; Wolfgang Boehm, Alzenau-Albstadt; Wolfgang Weise, Frankfurt am Main; Ulrich Muerrle, Hanau, all of Fed. Rep. of Germany

[73] Assignee: Degussa Aktiengesellschaft, Frankfurt, Fed. Rep. of Germany

[21] Appl. No.: 105,366

[22] Filed: Oct. 7, 1987

[30] Foreign Application Priority Data

Oct. 17, 1986 [DE] Fed. Rep. of Germany ....... 3635369

[51] Int. Cl.⁴ .......................... B05D 1/36; B05D 3/02
[52] U.S. Cl. .................................. 427/190; 427/192; 427/204; 427/205; 427/226; 427/229; 427/327; 427/328; 427/376.2; 427/376.3; 427/376.4; 427/383.5; 427/383.7; 427/404; 427/405; 427/406; 427/419.7
[58] Field of Search ........................ 427/229, 404–406, 427/419.7, 376.2, 376.3, 376.4, 376.8, 383.5, 383.7, 328, 328, 224, 205, 190, 192, 204

[56] References Cited

U.S. PATENT DOCUMENTS

| | | | |
|---|---|---|---|
| 2,351,798 | 6/1944 | Alexander | 427/229 |
| 2,512,455 | 6/1950 | Aktander | 427/229 |
| 3,663,280 | 5/1972 | Lee | 427/229 |
| 4,170,460 | 10/1979 | Donley | 427/229 |
| 4,223,826 | 9/1980 | Usui | 427/229 |
| 4,426,404 | 1/1984 | Shoher et al. | 427/229 |
| 4,434,211 | 2/1984 | Shoher et al. | 427/205 |
| 4,704,250 | 11/1987 | Cline et al. | 427/229 |

Primary Examiner—Janyce A. Bell
Attorney, Agent, or Firm—Beveridge, DeGrandi & Weilacher

[57] ABSTRACT

To coat metallic or ceramic surfaces with hard substances by means of brazing, a powder mixture of 60 to 90% silver, 2 to 35% copper, 2 to 30% tin and/or indium and 2 to 20% titanium, zirconium, hafnium, chromium, vanadium, tantalum, niobium, titanium hydride, zirconium hydride and/or hafnium hydride together with an organic binder and then the hard-substance powder are deposited on the surface and heated to 900° to 1200° C. The particle sizes of the metallic powders must be less than the particle size of the hard-substance powder.

8 Claims, No Drawings

METHOD FOR COATING SURFACES WITH HARD SUBSTANCES

The present invention relates to a method for surface-coating metallic and ceramic bodies with hard substances in the form of diamonds, ceramic oxides, nitrides, silicides and borides by brazing-deposition of corresponding powders in vacuum or under an inert gas.

BACKGROUND OF THE INVENTION

The deposition of hard substances on the surfaces of metallic or ceramic substrates is highly important in the manufacture of abrading, grinding and cutting tools. Among the known procedures are galvanic deposition, sintering of hard-substance dispersion on substrates or coating by means of an organic plastic.

The German AS No. 12 59 681 describes a procedure to join individual diamonds to metallic surfaces by brazing at 1100° to 1300° C. in vacuum or in an inert gas atmosphere using a binary or ternary solder of gold with 1 to 25% tantalum and/or 1 to 10% niobium. This procedure is comparatively labor intensive and requires costly gold solder.

The German AS No. 12 10 300 discloses a procedure wherein diamonds initially are immersed into a suspension of titanium powder and a solvent. After the volatile solvent has evaporated, the pre-coated diamonds are dipped into a melt of a silver-copper eutectic, the excess solder is removed and brazing then is carried out. This procedure is suitable to braze individual diamonds. Surface-coating with a fine-particulate dispersion of diamonds is impossible in this procedure.

The German OLS No. 24 11 785 discloses a procedure for the manufacture of grinding-tool surfaces by brazing diamond crystals which are not pre-coated on metal surfaces. The diamond crystals together with a powder of solder alloy and a binder are deposited on the surface and heated to about 1300° C. The solder used is an alloy with at least 50% nickel and at least 5% chromium. However the high brazing temperatures may cause graphitization of the diamond powder and may render the substrates unsuitable. Furthermore, the chromium portions of the solder require a furnace atmosphere with a very low dew point.

SUMMARY OF THE INVENTION

It is an object of the present invention to provide a method for coating the surface of metallic and ceramic bodies with hard substances in the form of diamonds, ceramic oxides, nitrides, silicides and borides by brazing corresponding powders on these bodies in vacuum or an inert atmosphere, where this method provides solid adhesion to the surface by means of simple method-steps and at comparatively low temperatures, and further, without precoating the hard substances.

In achieving the above and other objects, one feature of the invention resides in depositing the solder on the surfaces to be coated in the form of a powdered mixture of 60 to 90% silver powder, 2 to 35% copper powder, 2 to 30% tin and/or indium powder and 2 to 20% of one or more of titanium, zirconium, hafnium, chromium, vanadium, tantalum, niobium, titanium hydride, zirconium hydride and hafnium hydride in powder form together with an organic binder. The particle size of the metal powder is required to be less than that of the powder of the hard substance to be deposited, whereupon the powder of hard substance is deposited and the system as a whole is raised to temperatures between 900° and 1200° C. Preferably, the powdered hard substance is deposited in a dry condition onto the metal powder-binder layer previously coated onto the underlying substrate.

It is furthermore advantageous for the particle size of the pulverulent titanium, zirconium, hafnium or of their hydrides, and the particle size of chromium, vanadium, tantalum, niobium, to be smaller than the particle size of the silver powder.

DETAILED DESCRIPTION OF THE INVENTION

In carrying out an illustrative embodiment of the invention, initially a mixture of elementary metal powders is processed with a suitable organic binder to form a suspension. The particle size of the metal powders so used must be less than the particle size of the hard substance to be deposited. Especially advantageously, the particle size of the metal powder mixture must be substantially less than that of the hard-substance powder to be deposited. If the main component silver has a particle size substantially larger than the other powder components, a fine distribution of the components can be achieved in the suspension, which positively affects coating. The previously degreased metallic or ceramic substrate then is pre-coated with suspension, and this pre-coating then is dried. The organic binder can be any conventional volatilizable one, for instance ethyl cellulose or polymethylmethacrylate which does not interfere with the process.

The pre-dried component that is intended to be coated is sprayed in the next step with the pure binder or in individual cases may also be briefly dipped into the binder. The hard-substance powder is sprayed-on directly thereafter or is received by a suitable substrate. Commercially available dosing ducts may be used as the metering systems. Following another spray step, the precoated parts are dried.

Frequently it will be advantageous to paint the metallic or ceramic substrate with the binder before coating with the metal-powder suspension. The further steps of the method then are carried out in the manner initially described.

When coating sloping or vertical surfaces, the pre-coated parts may be provided with an inorganic support skin. This support skin prevents the liquid metal alloy and the hard-substance solder from running off.

The preparation of the actual compound layer on the metallic or ceramic substrate takes place at temperatures between 900° and 1200° C. Preferably, a high-purity argon atmosphere is used to prevent reactions between the active component of the metal-powder mixture and the remaining gases. A metal melt is formed during heating which wets both the hard substance and the metallic or ceramic substrate. During cooling, the hard substance is integrally bonded to the substrate by the formed solder.

In special cases it may be advantageous to deposit a fairly thick layer of hard substance and solder on the substrate. The method of the invention can be carried out by repeating a multiple of the deposition steps. During this procedure, the solder composition and the type and size of the hard substance may be varied from stratum to stratum.

Metallic or ceramic surfaces coated by this method are characterized by a uniform distribution of the hard substance.

The amount of the metallic component can be adjusted in such a manner that complete wetting of the imbedded hard substance is avoided while adhesion is optimal. This is an advantageous feature regarding the application of surfaces so made to work the most diverse materials such as ceramics, glass or metals.

The following examples illustrate the invention in greater detail:

EXAMPLE 1

The cylindrical surface of a cylindrical metallic body of steel 37 is pre-coated with a powder-binder mixture consisting of 70% by weight silver, 10% by weight copper, 10% by weight indium and 10% by weight titanium with a particle size of <40 microns, the body previously having been sprayed with a solution of 1 part polymethylenemethacrylate and 3 parts xylene. Following pre-drying for 10 minutes, the cylindrical surface again is sprayed with the binder mixture, then with diamond dust of 40-50 microns and is dried again. Thereupon the metallic body is moved into a quartz tube flushed with argon (dew point: −30° C.) and is brazed at 1090° C. The surface so obtained shows a uniform diamond distribution. When milling a 5 mm thick glass pane, higher abrasion was noted relative to a galvanized tool and the service life also was substantially longer.

EXAMPLE 2

The flat surface of a spherical frustrum made of steel and 7 mm in diameter is precoated with a powder mixture of 75% by weight silver, 12% by weight copper, 8% by weight indium and 5% titanium with a particle size of <60 microns.

The spherical frustrum first was sprayed with a solution of 1 part polymethylenemethacrylate and 3 parts xylene and immediately thereupon the powder mixture was sprayed on using a pouring duct. Following pre-drying for 5 minutes in a heated air stream at 50° C., the round surface was again sprayed with the binder, next sprayed with diamond powder of 60-80 microns from a vibration conveyor and dried again. The body so coated was brazed in Ar in a pass-through furnace at 1000° C. Coating and brazing were repeated once. A metal surface uniformly coated with diamonds was obtained. It was possible to abrade with high efficiency the edges of an aluminum oxide parallelipiped with 30 cm edges.

A cylinder of steel 37 with a 1.5 cm diameter and a height of 1.5 cm was dipped into a suspension of polymethylenemethacrylate and xylene present each in equal amounts by weight and further containing 79% by weight of silver powder, 15% by weight of copper powder, 10% by weight of indium powder and 5% by weight of titanium powder, and was dried for 10 min. The particles were ≦0.1 mm in size. Thereupon the pre-coated cylinder was sprayed with the binder mixture and further with silicon nitride of ≦0.2 mm grain size. Brazing was carried out under argon at 1050° C. The ceramic particles were found to be solidly bonded to the underlying basic material.

EXAMPLE 3

A cylinder of steel 37 with a 1.5 cm diameter and a height of 1.5 cm was dipped into a suspension of polymethylenemethacrylate and xylene (⅓ ratio) and a powder mixture of 70% weight silver, 10% by weight copper, 10% by weight indium and 10% by weight titanium and dried in air at room temperature for 10 min. The weight ratio of solid to binder was 1/1. Thereupon the binding mixture was sprayed onto the cylinder and directly thereafter the cylinder was sprayed with $Al_2O_3$ with a grain size of 250 um. The brazing took place at 1000° C. in argon in a quartz tube. Thereafter the ceramic powder was solidly bonded to the underlying substrate. Under high stress, the rupture took place in the aluminum oxide.

Further variations and modifications of the present invention will be apparent from the foregoing and are intended to be encompassed by the appended claims.

German priority application No. P 36 35 369.8-45 is relied and incorporated by reference.

We claim:

1. A method for coating at least one surface of a solid metallic and/or ceramic substrate body with hardsubstances selected from the group consisting of diamonds, ceramic oxides, nitrides, silicides, borides and mixtures thereof comprising depositing a solder and an organic A binder on said surface, said solder comprising a powdered metal mixture of 60 to 90% silver powder, 2 to 35% copper powder, 2 to 30% tin and/or indium powder and 2 to 20% of at least one of titanium, zirconium, hafnium, chromium, vanadium, tantalum, niobium, titanium hydride, zirconium hydride and hafnium hydride, where the particle size of the metallic powder is less than that of the powder of the hard-substance to be deposited, depositing a powder of a hard substance, and heating to a temperature between 900° and 1200° C.

2. The method defined in claim 1, wherein the hardsubstance powder is deposited dry on the metal powder-binder containing layer.

3. The method defined in claim 1 wherein the particle size of the pulverulent titanium, zirconium, hafnium or of their hydrides, of chromium, vanadium, tantalum, niobium is less than the particle size of the silver powder.

4. The method as defined in claim, wherein the substrate is metal.

5. The method as defined in claim 1, wherein the substrate is ceramic.

6. The method as defined in claim 1, wherein the substrate is coated with a suspension of said powdered metal mixture in an organic binder therefor, then dried and coated again with said suspension and thereafter coated with said hard-substance.

7. The method as defined in claim 1, wherein the substrate is coated with an organic binder, then is coated with said powdered metal mixture, and thereafter is coated with said hard-substance.

8. The method as defined in claim 1, wherein said heating is carried out under inert gas.

* * * * *